US008495744B2

(12) United States Patent
El Khoury et al.

(10) Patent No.: US 8,495,744 B2
(45) Date of Patent: Jul. 23, 2013

(54) EVALUATION OF RISK OF CONFLICT FOR SECURITY SOLUTIONS INTEGRATION

(75) Inventors: Paul El Khoury, Antibes (FR); Azzedine Benameur, Caromb (FR); Smriti Kumar Sinha, Tezpur (IN)

(73) Assignee: SAP AG, Walldorf (DE)

( * ) Notice: Subject to any disclaimer, the term of this patent is extended or adjusted under 35 U.S.C. 154(b) by 1094 days.

(21) Appl. No.: 12/410,562

(22) Filed: Mar. 25, 2009

(65) Prior Publication Data

US 2010/0250476 A1 Sep. 30, 2010

(51) Int. Cl.

| | |
|---|---|
| ***G06F 11/00*** | (2006.01) |
| ***G06F 12/14*** | (2006.01) |
| ***G06F 12/16*** | (2006.01) |
| ***G08B 23/00*** | (2006.01) |

(52) U.S. Cl.
USPC .................................. 726/25; 726/22; 726/23

(58) Field of Classification Search
USPC .......................................... 726/11-14, 22-25
See application file for complete search history.

(56) References Cited

U.S. PATENT DOCUMENTS

| | | | | |
|---|---|---|---|---|
| 2004/0034794 | A1 * | 2/2004 | Mayer et al. | 713/200 |
| 2007/0005774 | A1 * | 1/2007 | Singh et al. | 709/227 |
| 2008/0209501 | A1 * | 8/2008 | Mayer et al. | 726/1 |
| 2009/0007219 | A1 * | 1/2009 | Abzarian et al. | 726/1 |
| 2009/0138960 | A1 * | 5/2009 | Felty et al. | 726/14 |

* cited by examiner

*Primary Examiner* — Jeffrey Pwu
*Assistant Examiner* — Jayesh Jhaveri

(57) ABSTRACT

A method and a system for evaluation of risk of conflict between a number of integrating security solutions. In a computer system, a number of fragmentary security solutions are received. A set of the received fragmentary security solutions is integrated to form a composite security solution to satisfy a number of security requirements. In one aspect, the security requirements are established during a design of a computer system. A risk of conflict between the set of integrating fragmentary security solutions is evaluated. In another aspect, the risk of conflict between the set of integrating fragmentary security solutions exists at authority level and at configuration level. Conflict at authority level arises when different authorities control the same fragmentary security solution. Conflict at configuration level arises when integrating fragmentary security solutions share configuration data.

18 Claims, 10 Drawing Sheets

670

| | s1 | s2 | s3 | s4 | s5 |
|---|---|---|---|---|---|
| a1 | 1 | 0 | 0 | 1 | 0 |
| a2 | 0 | 1 | 0 | 1 | 0 |
| a3 | 0 | 0 | 1 | 0 | 0 |
| a4 | 0 | 0 | 0 | 0 | 1 |

680

| | s1 | s2 | s3 | s4 | s5 |
|---|---|---|---|---|---|
| s1 | - | 3 | 0 | 0 | 0 |
| s2 | 2 | - | 1 | 0 | 0 |
| s3 | 0 | 1 | - | 0 | 0 |
| s4 | 0 | 0 | 0 | - | 1 |
| s5 | 0 | 0 | 0 | 1 | - |

EVALUATION OF RISK OF CONFLICT FOR SECURITY SOLUTIONS INTEGRATION

FIELD OF INVENTION

The field of the invention relates generally to electronic data processing and to providing security solutions for computer systems. More specifically, a method and a system for evaluation of risk of conflict between a number of integrated security solutions are described.

BACKGROUND OF THE INVENTION

Computer systems vendors aim to provide secure business products by implementing various security solutions. Security solutions are built to satisfy different security requirements. Modem computer systems are built by integrating a large number of interacting or independent entities. These entities or components are often formed out of smaller systems that are integrated to provide the required functionality or set of services. To be compliant with one or more regulations, a computer system may have to satisfy several security requirements through independent security solutions. A security solution of a computer system may include properties such as access control, network security, cryptography, etc.

Typically, each component of a computer system could have different security requirements, which may be satisfied by one or more independent security solutions. Generally, it may be more efficient to combine existing security solutions of the system components, rather than designing an entirely new security solution for the entire computer system. However, combining disparate security solutions of system components can be challenging. The components of such system, and the respective security solutions, are provided and changed in different time periods by different software developers, and often by different vendors.

Independent, commercially available off the shelf (COTS) security solutions are available in the form of security patterns that capture expert knowledge in a structured way. Different integration schemes and mechanisms help to compose two or more security solutions to provide a complex solution for a set of security requirements or properties. However, the integration process may lead to conflicts. Therefore, an instrument to identify possible cases of conflict is necessary. For instance, a conflict arises whenever different authorities and configuration sharing exist among the solutions under integration.

SUMMARY OF THE INVENTION

A method and a system for evaluation of risk of conflict for a number of security solutions are described herein. A set of fragmentary security solutions are integrated in a composite security solution to satisfy a number of security requirements. The security requirements are established during a design of a computer system. A risk of conflict between the integrating fragmentary security solutions is evaluated. Risk of conflict between the integrating fragmentary security solutions exists at authority level and at configuration level. Conflict at authority level arises when different authorities control the same fragmentary security solution. Conflict at configuration level arises when integrating fragmentary security solutions share configuration data.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
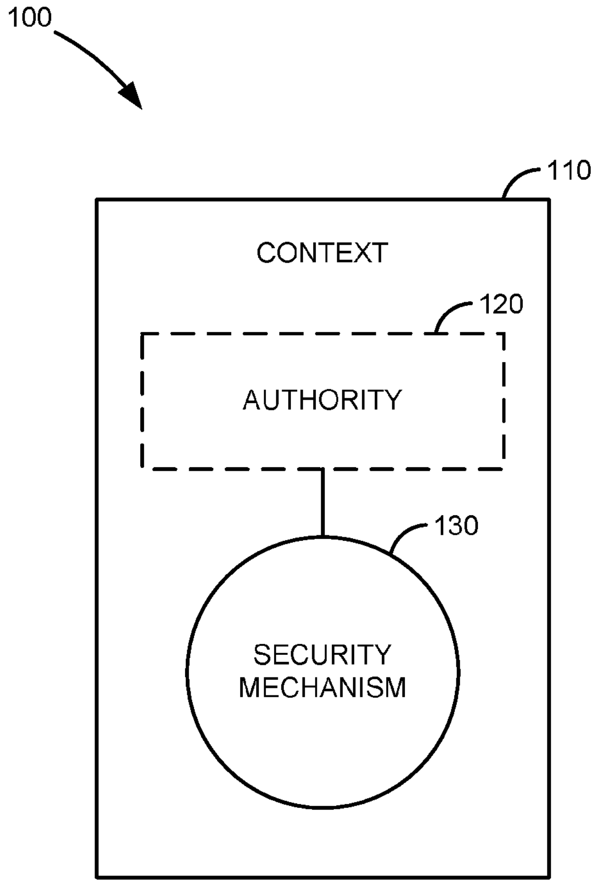
FIG. 1 is a block diagram that represents an abstract model of a security solution.

Historically, security solutions have been considered as non-functional or extra-functional extension of computer systems. The security solutions cohabit on top of the computer systems. An environment where a security solution is hosted in a computer system is called context. A computer system may include a number of components, each component to model and provide different set of functionality. A component of a computer system may include one or more software modules, or one or more hardware modules, or a combination of software and hardware modules. The different components of a computer system may define different contexts for the security solution of the computer system. The term "context" refers to a set of input variables needed for a security solution to operate. For example, in an access control model, the corresponding security solution needs environmental data such as resources, requesters, types of actions, etc., in order to operate.

The context could define both the logical and physical environment. An exemplary logical environment pre-condition for an authorization security solution may be: an extensible access control markup language (XACML) security pattern, which will work if and only if a user trying to access resources is authenticated by a user authentication pattern, and the necessary security tokens are provided along with access requests conformable with XACML policy enforcement point (PEP) interpretation. The physical environment may be the specific implementation of a security pattern, e.g., to run on Linux platform and with mySQ™ database.

An implementation of a security solution typically needs to be configured. The data required for the configuration is defined in a number of configuration variables belonging to different configuration objects. In one embodiment, the configuration objects, together with a number of environment objects and objects to be secured are collectively referred to as context objects. The environment objects are system specific and they are defined by the developer that implements a security solution. For example, environment objects for a computer system may be a set of specific libraries that need to be available for the security solution to run. The objects to be secured are the resources that the security solution has to protect.

A context typically has one or more controlling authorities. The components of a system that operate in a particular context are controlled objects. The controlled objects are of types environmental data, and security solutions. Usually, a security solution is implemented to adequately satisfy a given set of security requirements. An authority controls the configuration data of the security solution, e.g., policies, length of cryptographic keys, etc., and also controls the environmental resources, e.g., users, resources consumed by the solutions, etc. The term "security authority" has broad meaning that may include publicly recognized standards for security solutions, e.g., X.509, etc., certificate authorities, e.g., VeriSign Inc., GlobalSign™, etc., operating system processes, e.g., Local Security Authority Subsystem Service (LSASS) running in Microsoft Windows™, application or entity wide, vendor established security policies.

FIG. 1 is a block diagram that represents an abstract model of a security solution 100. According to this model, security solution 100 is represented with a three-tuple structure. The three tuples are context 110, authority 120 and security mechanism 130. Security mechanism 130 operates in context 110 and is controlled by authority 120. In this document, the term security solution refers to the three-tuple structure in a wider sense, and to the security mechanism in the narrow sense.

Figure 2:
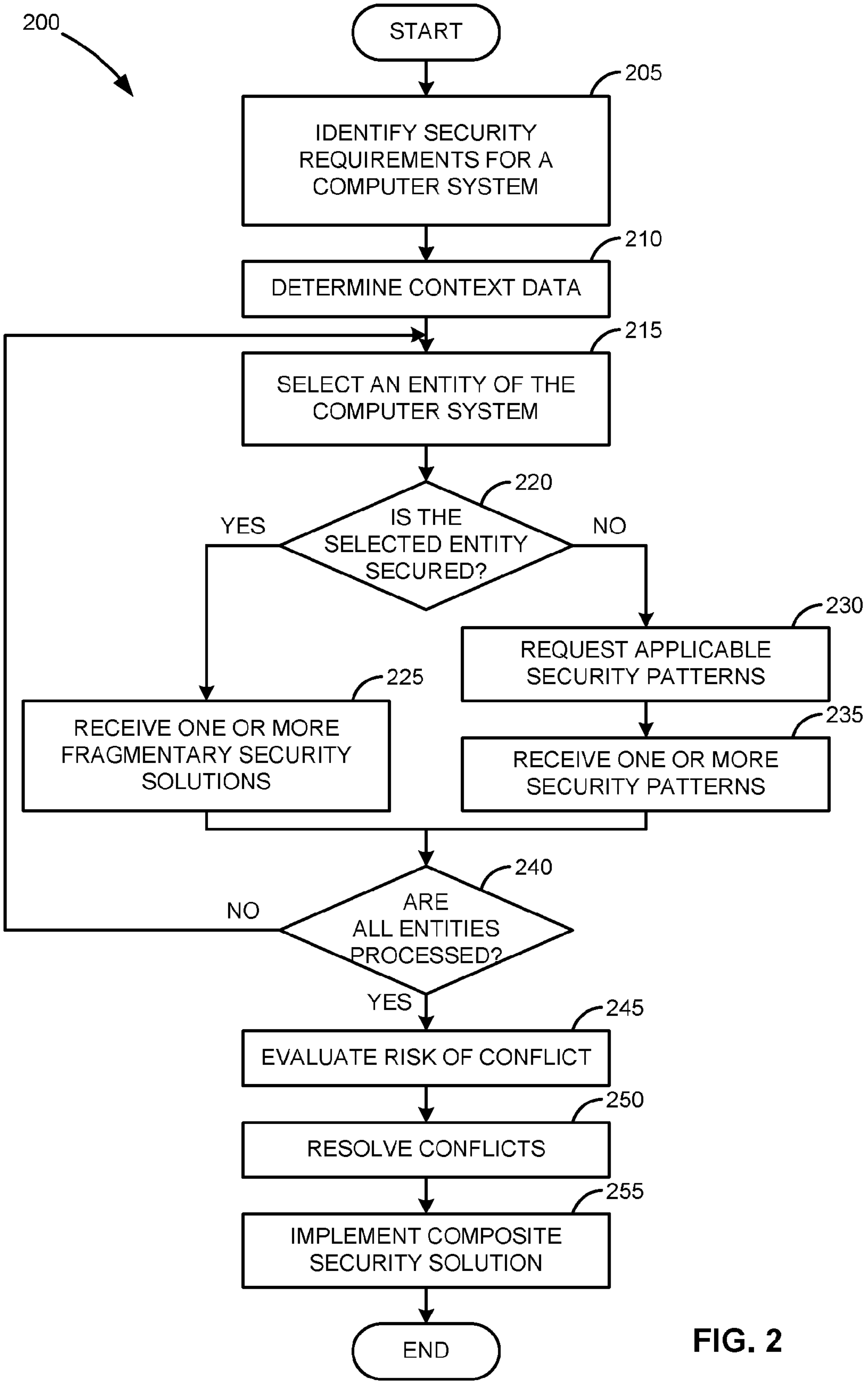
FIG. 2 is flow diagram illustrating an exemplary process of developing a composite security solution for a computer system by integrating a number of fragmentary security solutions, according to one embodiment of the invention.

FIG. 2 illustrates a process 200 of developing a composite security solution for a computer system by integrating a number of fragmentary security solutions, according to one embodiment of the invention. According to one embodiment of the invention, a computer system is secured with a composite security solution that results from integration of two or more separate security solutions. In this document, the separate security solutions that are integrated in a composite security solution are referred to as fragmentary security solutions. Preferably, each fragmentary security solution satisfies a subset of the security requirements for the computer system.

At block 205, a number of security requirements for the computer system are identified. The identified security requirements have to be satisfied by the security solution of the computer system. In one embodiment, the security requirements may initially be defined by the computer system developers. Typically, the security solution for the computer system satisfies the identified security requirements in a specific context. At block 210, data for this specific context is determined or collected.

The computer system could be divided into a number of entities or components. Each entity provides a certain part of the functionality of the computer system. The different components may include software modules that run on different hardware and software platforms, e.g., in different contexts. Depending on the functionality, the separate entities may have their specific security requirements. The security solution for the computer system has to satisfy the requirements of the different entities in their relevant contexts. Often, some of the computer system components are already developed and secured with applicable security solutions.

It is more efficient to design a security solution for a computer system if the security requirements and context data are grouped by the different entities of the computer system. At block 215, an entity of the computer system is selected. At block 220, a check is performed to confirm whether the selected entity is already secured adequately with one or more fragmentary security to meet the entity's security requirements within the entity's operating context. In case the entity is secured, the one or more fragmentary security solutions are received at block 225. In one embodiment, 'to receive a security solution' means to receive the characteristics or the description of the security solution. Such characteristics include information about the satisfied security requirements, e.g., the security properties of the solution; the context data including environment objects, configuration objects, and objects to be secured; and the security algorithm. The description of a security solution may include information about the controlling authorities as well. Alternatively, the information for the controlling authorities may be provided by system developers, or based on default security requirements and context.

If the selected entity is not secured, e.g. when it is under development, an adequate security solution may be built by using one or more security patterns. There are a growing number of security patterns that provide a base for implementing independent security solutions to satisfy certain security requirements in specific contexts. Descriptions of such security patterns with their implementations and contexts can be made available in security pattern libraries. Security pattern approach is now popular as a mechanism to provide solutions to security problems by capturing expert domain knowledge in a structured way. Different integration schemes are available to provide a way to integrate two or more security solutions to provide a composite security solution for a set of security properties.

At block 230, a number of applicable security patterns are requested from one or more security pattern libraries, in accordance with the identified security requirements and determined context data. For example, when a developer wants to implement a security solution for a given component of the computer system, she or he provides the security requirements in terms of security properties, and the information about the deployment platform, e.g., the context data. Based on these input data, a pattern manager module of a security pattern library selects one or more security patterns from the stored security patterns. The security patterns may be stored in a library described in a pseudo language as illustrated in table 1:

TABLE 1

Security pattern

```
<name>Pattern's name</name>
<Security Requirements>
    <SecurityRequirement>Confidentiality</SecurityRequirement>
    <features>
        <feature>cardinality constraint</feature>
        <feature>attribute granularity</feature>
    </features>
</Security Requirements>
<context objects>
    <environmental objects>
        <preconditionComplex id="!@#!">
            <precondition>Apache server</precondition>
            <precondition>Java</precondition>
        </ preconditionComplex >
        <precondition>JavaLibraryXYZ</precondition>
    </environmental objects>
    <configuration objects>
        <configurationComplex id="access control policy">
            <configuration>role</configuration>
            <configuration>action</configuration>
            ...
        </ configurationComplex >
        <configuration>Separation of duty</configuration>
    </ configuration objects>
    <objects to be secured> // OTBS
        <OTBSComplex id="!@#!">
            <OTBS>Web content</OTBS>
        </ OTBSComplex >
        <OTBS>...</OTBS>
    </ objects to be secured >
</context objects>
<algorithm>XACML attribute based evaluation</algorithm> // an
example
<consequence>...</consequence>
```

At block 235, one or more security patterns that satisfy the provided security requirements in the specified context are received. In this document, 'to receive a security pattern' means to receive a description of a fragmentary security solution, e.g., to receive the information about security requirements that can be met by implementing the solution, the context data including environment objects, configuration objects, objects to be secured and the security algorithm. Security patterns are used as a base for generating and implementing fragmentary security solutions. The term fragmentary security solution can refer to an implemented security solution as well as to a security pattern.

The operations of blocks 215 through 235 are executed repeatedly for all entities of the computer system that have to be secured, until, at block 240, it is confirmed that all such entities are processed. The developers of the computer system have to integrate some or all of the received fragmentary security solutions in a composite security solution. A composite security pattern for the composite security solution may be generated on the fly or may be persistently stored in a library as a new security pattern for future use.

During the integration, there is a risk of conflicts between the fragmentary security solutions. The security patterns or the fragmentary security solutions under integration may be designed by different security experts, or in different coordinates in space and time, pursuing different objectives. Thus, the composite security solution is prone to conflicts between incoherent fragmentary security solutions. In many cases, such conflicts are noticeable only at runtime. For instance, conflicts arise when there are shared member variables of different objects involved in the integration process, like context object, environment objects, configuration objects, etc. In order to avoid such a situation, at block 245, risk of conflicts is evaluated. The conflicting points between the integrating fragmentary security solutions are earmarked.

At block 250, the identified conflicting points are accessed and the potential security conflicts are resolved by appropriate conflict resolution measures. The composite security solution, resulting from the integration of a number of the received fragmentary security solutions, is implemented on top of the computer system at block 255.

One particular example of security solutions are security protocols. A protocol by definition is a multi-party algorithm including two types of steps, a communication step and a computation step. From a software engineering perspective, a simple abstraction of security protocols is secure connections. By definition, a connection is a means of communication between a lead and a follow, where the lead and the follow are two computer systems, or two components of a computer system. Security protocols require less environmental data and much more configuration data for the algorithm behind the solutions. Abstractions of security protocols are described herein using one context, one security mechanism, and two different authorities controlling the environmental data of the context. It will be obvious for one skilled in the art that the techniques described herein can be applied to other types of security solutions as well.

The abstract security solution model illustrated in FIG. 1 will be used as a basis for describing a security conflict evaluation scheme. For the purpose of describing the invention, S is a set of security solutions, C is a set of context data, E is a set of environmental attributes, where $E \subset \{C \cap S\}$, A is a set of controlling authorities, and R is a set of relations. In a composite security solution, a first category of relations is between one controlling authority and another controlling authority, or between a controlling authority and controlled object types:

$R_{AA} \subseteq A \times A$ where relations are between a controlling authority and another controlling authority;

$R_{AE} \subseteq A \times E$ where relations are between a controlling authority and an environmental attribute;

$R_{AS} \subseteq A \times S$ where relations are between a controlling authority and configuration data of a security solution.

A second category of relations in a composite security solution is between one type of controlled object and another type of controlled object:

$R_{SS} \subseteq S \times S$ where relations are between one type of security solution configuration data and another type of security solution configuration data;

$R_{EE} \subseteq E \times E$ where relations are between one type of environmental data and another type of environmental data;

$R_{ES} \subseteq E \times S$ where relations are between one type of environmental data and another type of security solution configuration data.

Figure 3A:
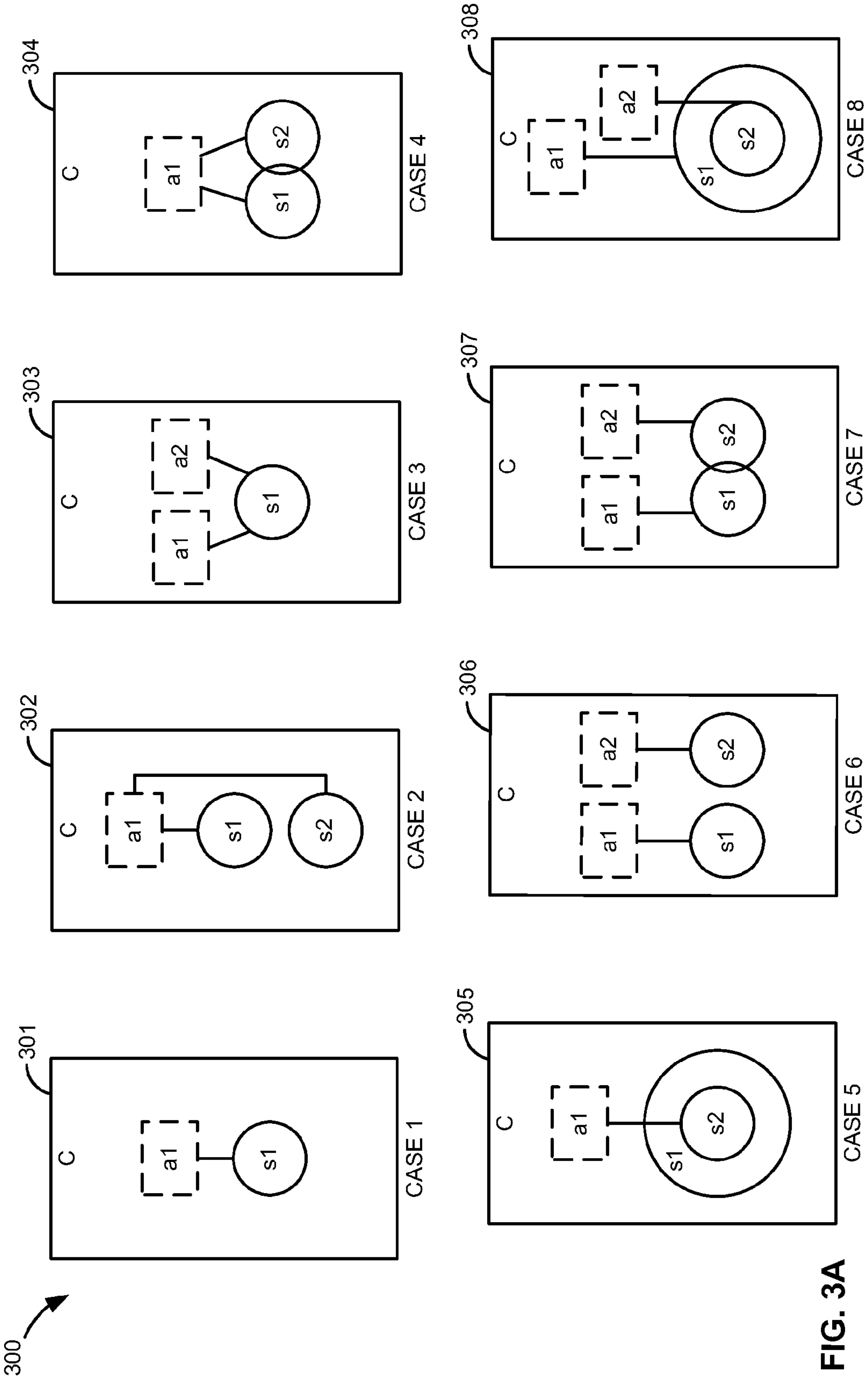
FIG. 3A is a block diagram illustrating possible variants for integration between fragmentary security solutions, according to one embodiment of the invention.

FIG. 3A is block diagram 300 illustrating possible variants for integration between security solutions, according to one embodiment of the invention. The integration is a binary operation, where its operands are two security mechanisms, e.g., two security solutions. The operation must be conformable, in the sense that the set E of environmental attributes corresponding to the first security solution s1 and to the second security solution s2 should be compliant. Intuitively, the integration of security solutions is considered a closed operation. If such integration is an open operation, it implies conflicts. The conflict between two different security solutions leads to insecure integrated solution, e.g., the integration is open. The conflict reduces or breaks the level of satisfaction of the security requirements that are separately satisfied by the two security solutions.

FIG. 3A enlists a classification of eight types of integration between two security solutions and two authorities applied on top of the same context. The classification helps to match all possible conflicts to the variants of security solutions integration:

- case 1, 301—One authority controls one security solution type, or security mechanism, 1:1 relationship, no risk of conflict;
- case 2, 302—One authority controls many distinct security solutions, 1:M relationship, no risk of conflict;
- case 3, 303—Two authorities control one security solution, M:1 relationship, risk of conflict at authority level;
- case 4, 304—Two security solutions have common configuration data or shared resources, under the same authority, risk of conflict at configuration level;
- case 5, 305—A security solution is a subset of another security solution under the same authority, risk of conflict at configuration level;
- case 6, 306—Two distinct security solutions under two different authorities in the same environment, no risk of conflict;
- case 7, 307—Two security solutions have common configuration data or shared resources under two different authorities, risk of conflict at configuration level;
- case 8, 308—A security solution is a subset of another security solution under two different authorities, risk of conflict at configuration level.

Risk of conflict at authority level exists when more than one authority controls the same security solution. In this case there are relationships of the type $R_{AA}$ between the different controlling authorities. The different controlling authorities may require different setup of the controlled security solution. Risk of conflict at configuration level exists when more than one security solution shares configuration data. In this case, a $R_{SS}$ relationship between security configuration data of one solution and security configuration data of another solution exists. The interfering configuration data may involve different context objects, e.g., configuration objects, environment objects and objects to be secured. Accordingly, the integrating security solution may require different properties from the same context object.

Figure 3B:
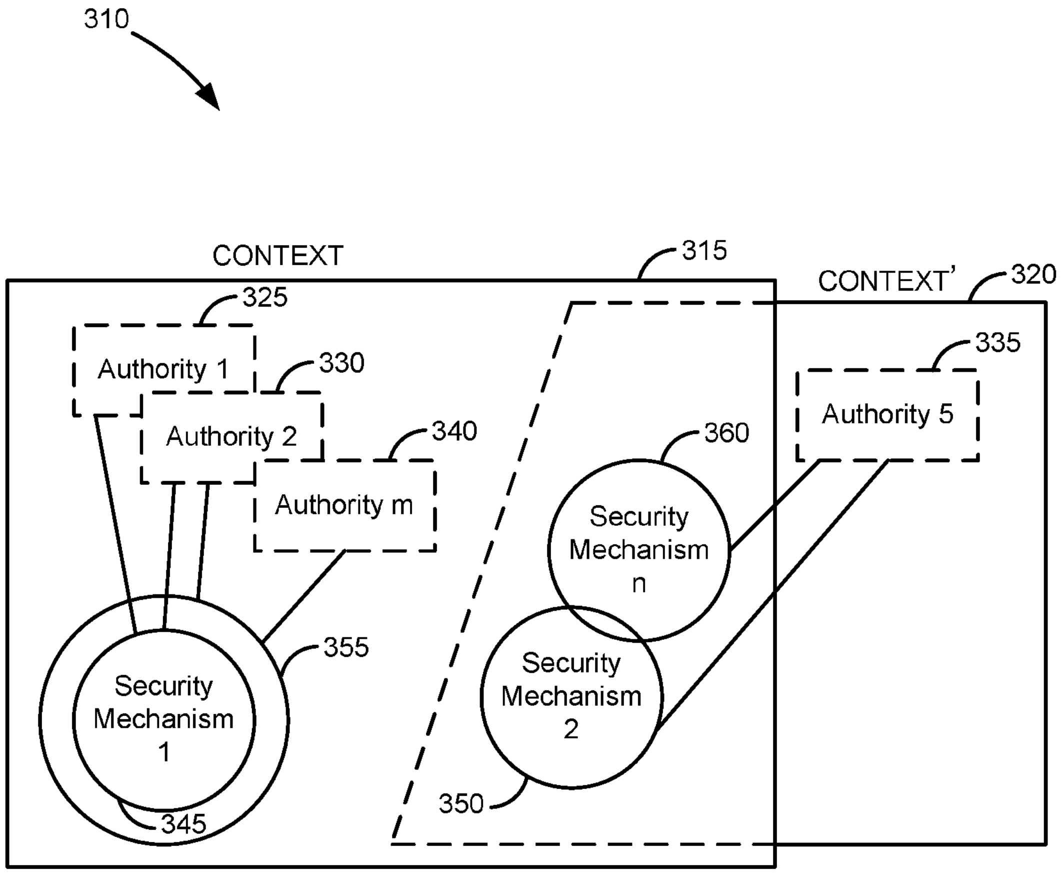
FIG. 3B is a block diagram of a generic schema of a composite security solution that integrates a number of fragmentary security solutions, according to one embodiment of the invention.

Any complex integration schema could be decomposed into combinations of the enlisted eight elementary variants of binary integration schemas. FIG. 3B is a block diagram of a generic schema of a composite security solution that integrates a number of fragmentary security solutions, according to one embodiment of the invention. In FIG. 3B, an exemplary security schema 310 is presented, where m authorities illustrated with elements 325, 330, 335 and 340 are controlling n security solutions illustrated with blocks 345, 350, 355 and 360. The authorities and the security solutions operate within the same context resulting from a combination of contexts 315 and 320. This complex schema could be decomposed into a sequence of combinations of the eight simple variants enlisted in FIG. 3A. Thus, the risk of conflict in a composite security solution built by the complex schema of FIG. 3B could be evaluated as a result of the risks of conflicts associated with the elementary binary integrations.

Figure 4A:
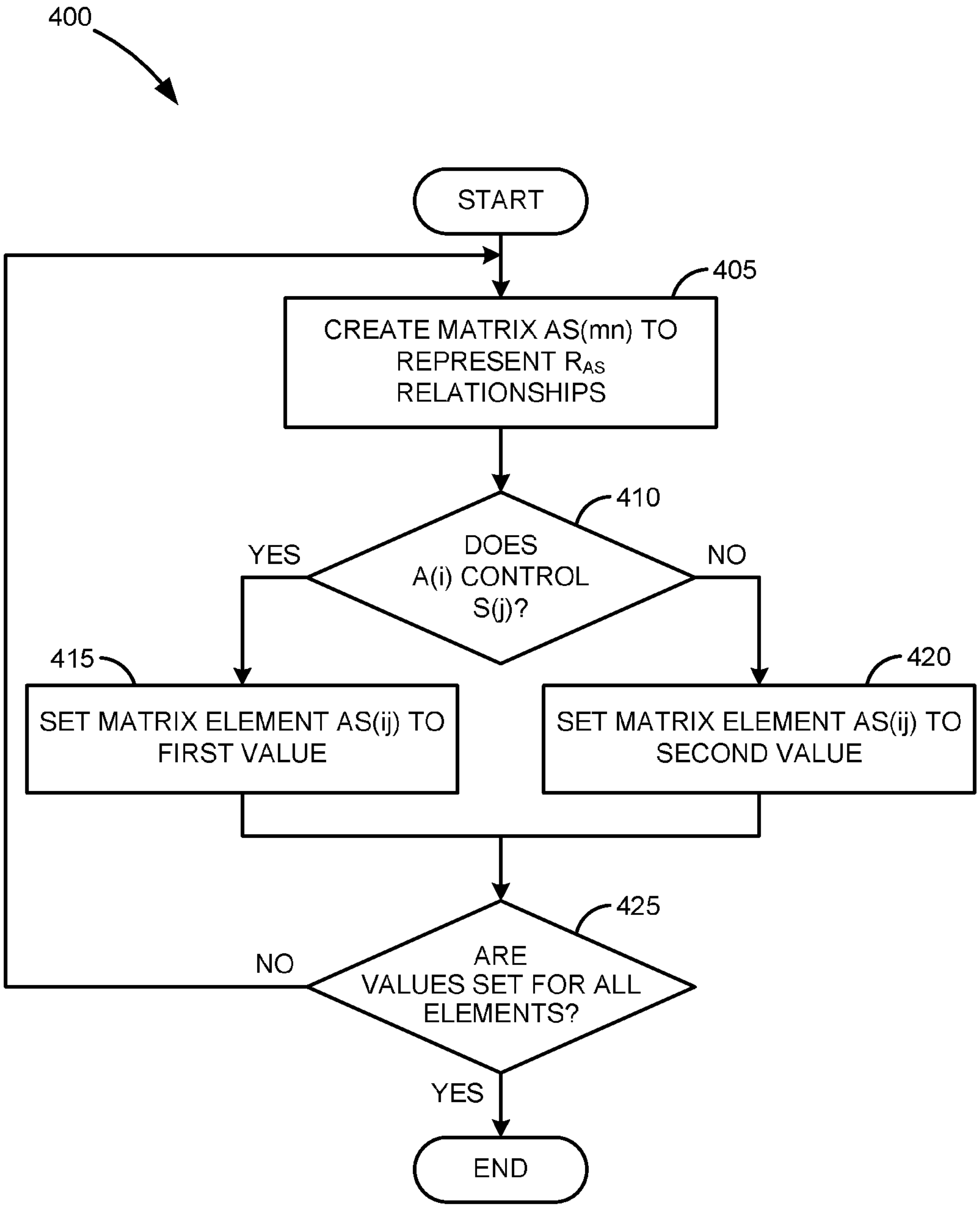
FIG. 4A illustrates a process for decomposing a complex security schema of a composite security solution to evaluate risk of conflict at authority level, according to one embodiment of the invention.

FIG. 4A illustrates a process 400 for decomposing a complex security schema of a composite security solution to evaluate risk of conflict at authority level, according to one embodiment of the invention. At block 405, a matrix AS (m×n) or AS (mn), with authorities A as rows and fragmentary security solutions S as columns, is created to represent $R_{AS}$ relationships. Each of m authorities of the composite security solution correspond to a different row of matrix AS(mn). Respectively, each of n fragmentary security solutions of the composite security solution correspond to a different column of matrix AS(mn).

At block 410, a check is performed to confirm whether an authority A(i) corresponding to the $i^{th}$ row controls a fragmentary security solution S(j) corresponding to the $j^{th}$ column. For example, referring to composite security solution in FIG. 3B, fifth authority 335 controls second security mechanism 350 and does not control first security mechanism 345. Referring back to FIG. 4A, at block 415, matrix element AS(ij) on the $i^{th}$ row and $j^{th}$ column is set to a first value when authority A(i) controls fragmentary security solution S(j). At block 420, matrix element is set to a second value when authority A(i) authority does not control fragmentary security solution S(j).

The operations of blocks 410 through 420 are executed repeatedly for all elements of matrix AS(mn), until, at block 425, it is confirmed that values for all matrix elements are set. Matrix AS(mn) is a binary matrix, as all of the elements of the matrix are set either to the first value, or to the second value. The first value may be "1" and the second value may be "0", alternatively, the first value may be "true" and the second value may be "false", etc.

Figure 4B:
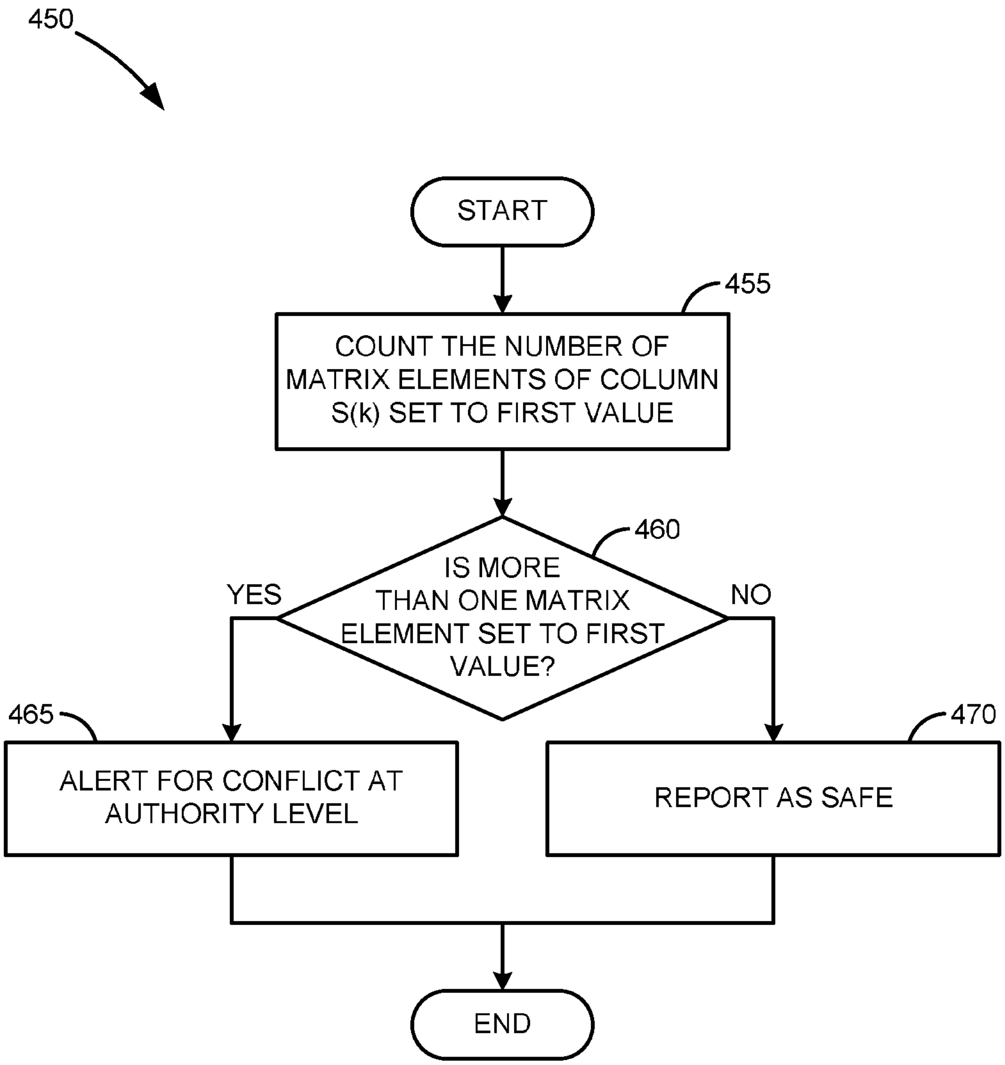
FIG. 4B illustrates a process to identify risk of conflict at authority level based on a decomposition of a complex security schema, according to one embodiment of the invention.

FIG. 4B illustrates a process 450 to identify risk of conflict at authority level based on a decomposition of a complex security schema, according to one embodiment of the invention. According to one embodiment of the invention, $k^{th}$ column of matrix AS(mn) corresponds to a fragmentary security solution S(k). At block 455, the number of matrix elements of kch column set to the first value is counted.

The process 450 continues at block 460 where a check is performed to confirm if the number of matrix elements counted as set to the first value of kth column is greater than one. If more than one matrix element is set to the first value, risk of conflict at authority level exists for the corresponding fragmentary security solution, and an alert for risk of conflict at authority level is triggered at block 465. Otherwise, at block 470, the fragmentary security solution S(k) is reported as safe.

The process 450 is used for evaluation of risk of conflict at authority level for a pair of integrating fragmentary security solutions as well. Let fragmentary security solution S(i), corresponding to $i^{th}$ column of matrix AS(mn), integrate with fragmentary security solution S(j), corresponding to $j^{th}$ column of matrix AS(mn). Each element of the $i^{th}$ column is joined in logical disjunction with the element of the $j^{th}$ column that is on the same row. The logical disjunction is equal to the first value, if any of the joining elements is set to the first value. Otherwise, the logical disjunction is equal to the second value. The results of the disjunctions between the elements of the ith and $j^{th}$ columns may be stored as a new column appended to the matrix AS(mn). At block 460, the number of elements of this new column that are equal to the first value are counted. If more than one elements are counted, an alert for risk of conflict at authority level between fragmentary security solutions S(i) and S(j) is triggered at block 465. Otherwise, at block 470, the integration between the fragmentary security solutions S(i) and S(j) is reported as safe.

Figure 5:
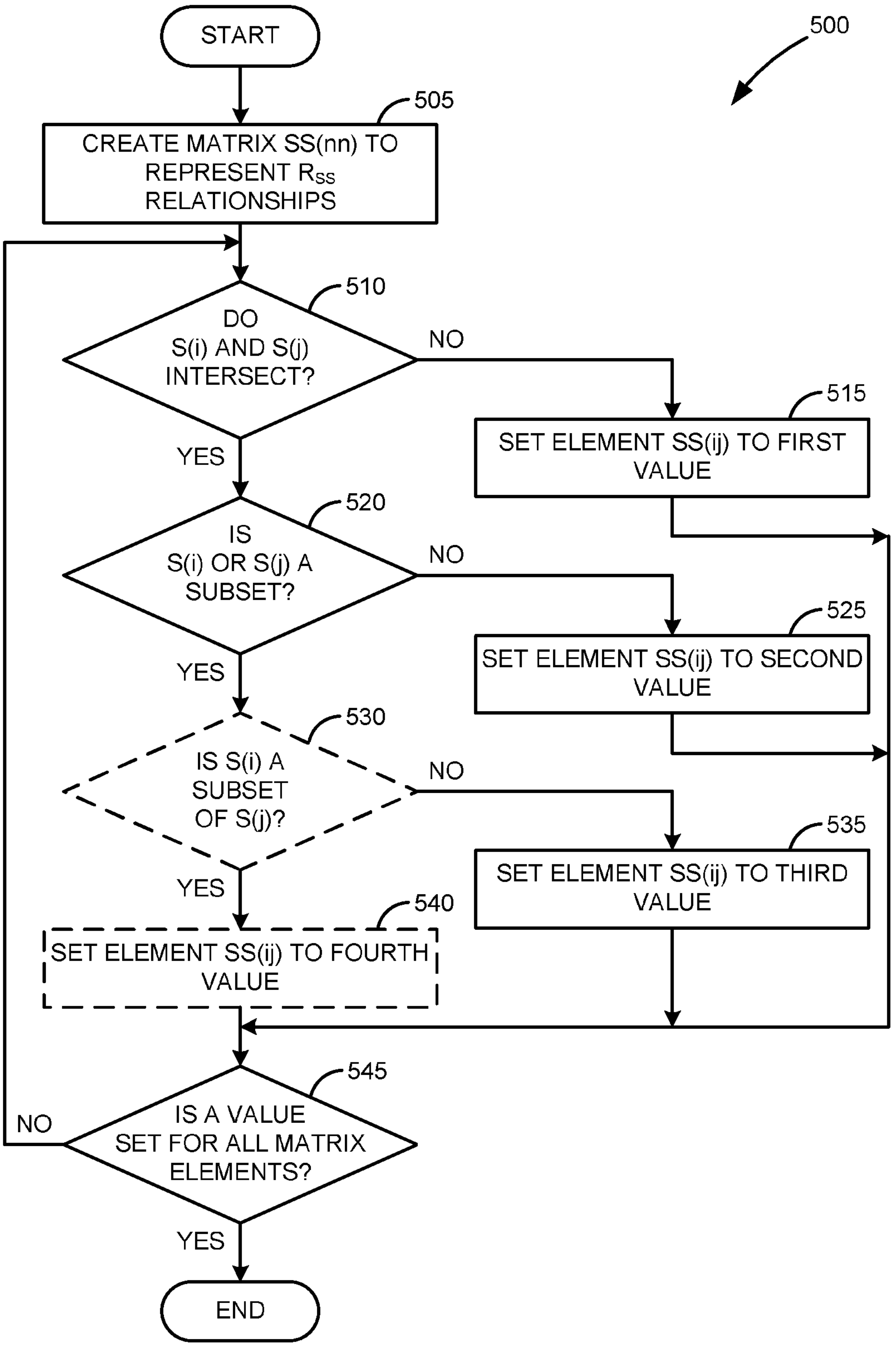
FIG. 5 illustrates a process for decomposing a complex security schema of a composite security solution to evaluate risk of conflict at configuration level, according to one embodiment of the invention.

FIG. 5 illustrates a process 500 for decomposing a complex security schema of a composite security solution to evaluate risk of conflict at configuration level, according to one embodiment of the invention. At block 505, a square matrix SS (n×n) or SS(nn), with fragmentary security solutions S as rows and columns, is created to represent $R_{SS}$ relationships. Each of n fragmentary security solutions of the composite security solution correspond to a row and to a column of matrix SS(nn).

At block 510, a check is performed to confirm whether the configuration data of fragmentary security solution S(i), corresponding to the $i^{th}$ row of matrix SS(nn), intersects with the configuration data of fragmentary security solution S(j), corresponding to the $j^{th}$ row of matrix SS(nn). In case there is no intersecting configuration data, the corresponding matrix element SS(ij) is set to a first value at block 515.

In case there is intersecting configuration data, then at block 520, a check is performed to confirm whether the intersection between the configuration data of S(i) and the configuration data of S(j) means that the configuration data of one of the paired fragmentary security solutions is a subset of the configuration data of the other fragmentary security solution. That would mean that one of the paired fragmentary security solutions is a subset to the other. If none of the paired fragmentary security solutions is a subset to the other fragmentary security solution, the corresponding matrix element SS(ij) is set to a second value at block 525. Otherwise, at block 530, a check is performed to confirm whether the $i^{th}$ fragmentary security solution S(i) is a subset to the $j^{th}$ fragmentary security solution S(j). At block 535, the corresponding matrix element SS(ij) is set to a third value if S(i) is not a subset to S(j), e.g., when S(i) security solution is a superset to S(j) security solution. At block 540, matrix element SS(ij) is set to a fourth value when S(i) is a subset to S(j).

The operations of blocks 510 through 540 are executed repeatedly for all elements of matrix SS(nn), until, at block 545, it is confirmed that all matrix elements that correspond to a pair of different fragmentary security solutions are set to any one of the four values. The process 500 ends at block 550.

Blocks 530 and 540 of process 500 are in dotted lines to illustrate that they could be omitted in an alternative embodiment of the invention. If omitted, the corresponding matrix element SS(ij) is set to third value when S(i) is either super-solution or sub-solution to S(j). In one embodiment of the invention, the first value is "0", the second value is "1", the third value is "2", and the fourth value is "3". Matrix SS(nn) is a weighted matrix as its elements store different values to indicate different causes for conflicts on configuration level.

With the help of matrix SS(nn) the risk of conflict at configuration level between any two fragmentary security solutions that are integrated in a composite security solution could be evaluated. Risk of conflict at configuration level between two fragmentary security solutions exist when the intersecting matrix elements, corresponding to the two fragmentary security solutions, are not set to the first value.

Referring back to FIG. 2, at block 245 of process 200, the received fragmentary security solutions are used for building the two matrices AS(mn) and SS(nn) by applying the processes illustrated in FIG. 4A and FIG. 5. The composite security solution of the computer system combines a number of integrating pairs of fragmentary security solutions. With the help of the matrices, the risk of conflict in the composite security solution is evaluated. Appropriate measures for resolving or mitigating the conflicts could be identified for each particular pair of integrating fragmentary security solutions. Additionally, when the security requirements of the computer system could be satisfied with different combinations between the received fragmentary security solutions, the combination with the lower risk of conflict could be selected.

Figures 6A, 6B, 6C:
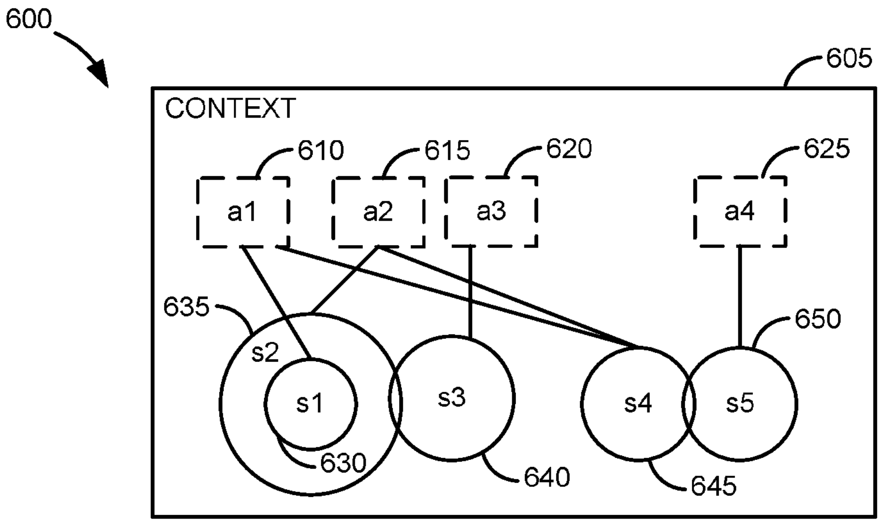
FIG. 6A is a block diagram of an exemplary composite security solution, according to one embodiment of the invention.
FIG. 6B illustrates a matrix representing relationships between authorities and fragmentary security solutions, according to one embodiment of the invention.
FIG. 6C illustrates a matrix representing relationships between pairs of fragmentary security solutions, according to one embodiment of the invention.

FIG. 6A is a block diagram of an exemplary composite security solution 600, according to one embodiment of the invention. Within context 605, authorities a1 610, a2 615, a3 620 and a4 625 control fragmentary security solutions s1 630, s2 635, s3 640, s4 645 and s5 650. Illustrated fragmentary security solutions integrate within context 605 under the control of authorities into composite security solution 600. FIG. 6A depicts the dependencies between authorities and fragmentary security solutions. With the help of the algorithms described in paragraphs [0041]-[0053, the types of integration in the composite security solution could be analyzed and understood.

FIG. 6B illustrates a matrix representing relationships between authorities and fragmentary security solutions, according to one embodiment of the invention. The matrix illustrated in FIG. 6B is binary matrix 670 built by applying the algorithm described in paragraphs [0041]-[0043] and illustrated in FIG. 4A. Binary matrix 670 represents the existing $R_{AS}$ relationships between the authorities and the fragmentary security solutions within composite security solution 600. A matrix element of binary matrix 670 is set to "0" when the authority corresponding to the row of the element does not control the fragmentary security solution corresponding to the column of the element. Respectively, a matrix element of binary matrix 670 is set to "1" when the authority corresponding to the row of the element controls the fragmentary security solution corresponding to the column of the element. All elements of binary matrix 670 are set to either "0" or "1", respectively.

FIG. 6C illustrates a matrix representing relationships between pairs of fragmentary security solutions, according to one embodiment of the invention. The matrix illustrated in FIG. 6C is weighted square matrix 680 built by applying the algorithm described in paragraphs [0047]-[0050] and illustrated in FIG. 5. Weighted square matrix 680 represents the existing $R_{SS}$ relationships between the fragmentary security solutions within composite security solution 600. A matrix element of weighted square matrix 680 is set to "0" when the fragmentary security solution corresponding to the row of the element and the fragmentary security solution corresponding to the column of the element do not intersect or share configuration data. A matrix element of weighted square matrix 680 is set to "1" when the fragmentary security solution corresponding to the row of the element and the fragmentary security solution corresponding to the column of the element intersect, e.g., when partial relationship between the pair of fragmentary security solutions exists. A matrix element of weighted square matrix 680 is set to "2" when the fragmentary security solution corresponding to the row of the element is a superset of the fragmentary security solution corresponding to the column of the element. A matrix element of weighted square matrix 680 is set to "3" when the fragmentary security solution corresponding to the row of the element is a subset of the fragmentary security solution corresponding to the column of the element. All elements of weighted square matrix 680 that represent a pair of two different fragmentary security solutions are set to one of the four values, respectively.

For example, let consider a pair of fragmentary security solutions s1 630 and s2 635 that intersect in composite security solution 600 in FIG. 6A. According to binary matrix 670 of FIG. 6B, two separate authorities control fragmentary security solutions s1 and s2. Respectively, risk of conflict at authority level exists. Further, according to weighted square matrix 680 of FIG. 6C, fragmentary security solution s1 is subset of fragmentary security solution s2. Respectively, risk of conflict at configuration level exists as well. Based on such analysis, a designer of a composite security solution should select an appropriate type of conflict management measure to resolve the identified possible conflicts.

Figure 7:
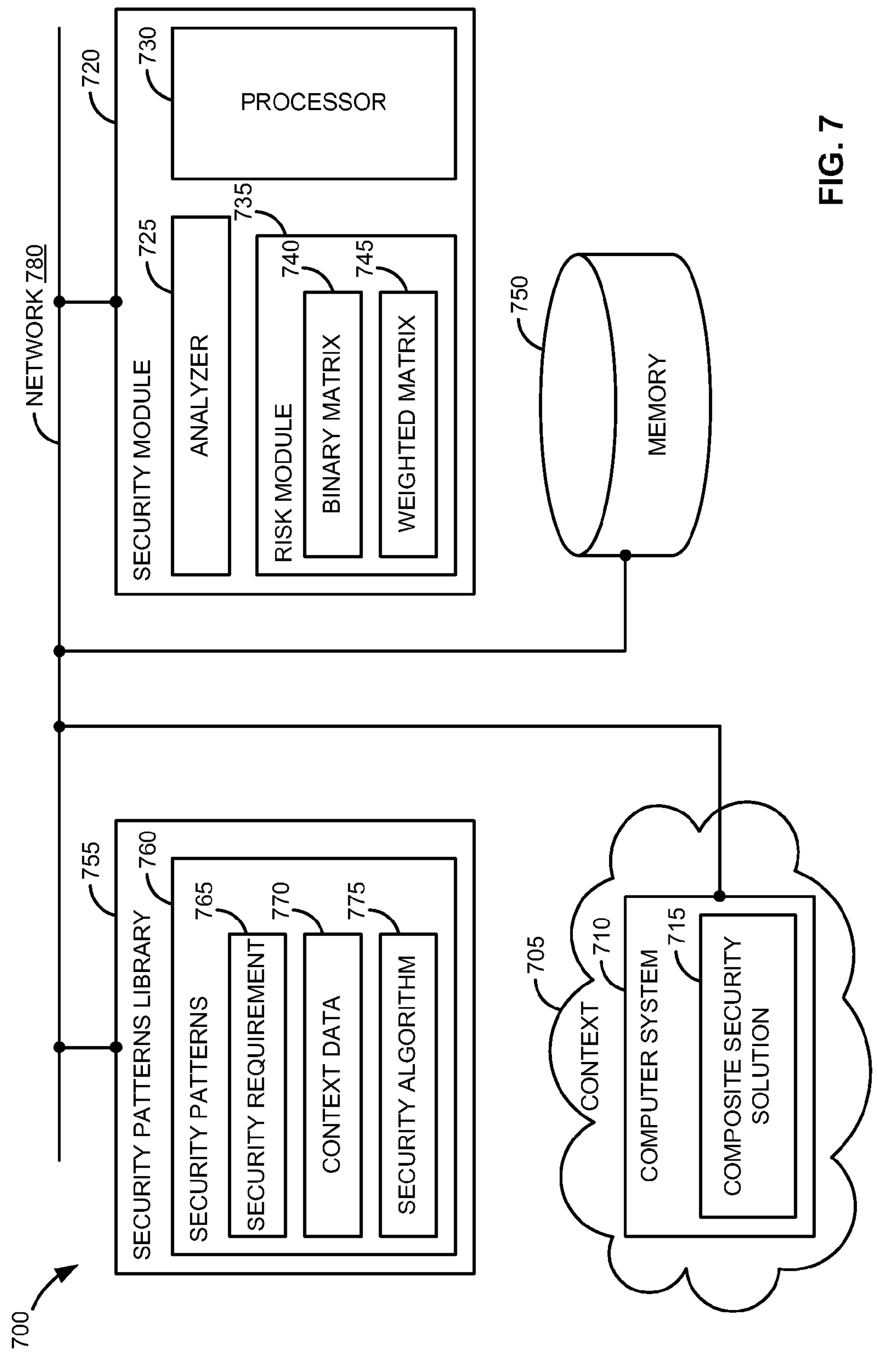
FIG. 7 is a block diagram of an exemplary computer system for evaluation of risk of conflict between a number of fragmentary security solutions integrated in a composite security solution, according to one embodiment of the invention.

FIG. 7 is a block diagram of an exemplary system 700 operable for generating a composite security solution for a computer system, according to one embodiment of the invention by integrating a plurality of fragmentary security solutions. System 700 includes computer system 710 executed in context 705. On top of computer system 710, composite security solution 715 is implemented to satisfy a number of security requirements in context 705. Composite security solution 715 is provided by security module 720. Security module 720 integrates a plurality of fragmentary security solutions to build and implement composite security solution 715.

Security module 720 includes analyzer 725 to identify one or more security requirements that the composite security solution 715 has to satisfy. Analyzer 725 also determines context data 770 for context 705 where composite security solution 715 runs. Analyzer 725 may analyze each separate component or entity of computer system 710 and determine context data 770 for each separate entity, when the entities run in different contexts 705. Context data 770 includes information about existing context objects. The context objects include environment objects, e.g., physical context, configuration objects, e.g., logical context and objects to be secured.

Security module 720 receives a number of fragmentary security solutions that are applicable for securing the entities of computer system 710. It is possible for all or some of the entities of computer system 710 to be previously developed and secured with one or more fragmentary security solutions. Security module 720 extracts descriptions of such fragmentary security solutions. Alternatively, based on the identified security requirements and determined context data 770, security module 720 queries library of security patterns 755 in order to receive one or more applicable security patterns 760. Each security pattern 760 is described by one or more security requirements 765, context data 770 and one or more security algorithms 775. Security pattern 760 satisfies security requirements 765 in context 705, characterized by context data 770, by applying security algorithm 775. Further, security module 720 receives information about a number of authorities that control the received fragmentary security solutions.

Security module 720 includes processor 730 to execute instructions comprised in the analyzer module 725 and risk module 735 to generate composite security solution 715 based on the fragmentary security solutions received from the secured entities of computer system 710, or from library of security patterns 755. During integration, risk module 735 creates and stores binary matrix 740 to analyze the relationships between authorities and fragmentary security solutions, as described in paragraphs [0041]-[0043]. Based on binary matrix 740, risk module 735 identifies and alerts risk of conflict at authority level for a single fragmentary security solution, or for a combination of fragmentary security solutions.

Risk module 735 creates and stores weighted matrix 745 to analyze the relationships between the different fragmentary security solutions, as described in paragraphs [0047]-[0050]. Based on weighted matrix 745, risk module 735 alerts for risk of conflict at authority level between a pair of integrating fragmentary security solutions. Risk module 735 could store binary matrix 740 and weighted matrix 745 in memory 750. Memory 750 could be an external storage and used by any of the modules of computer system 700 for storing data. The modules of computer system 700 are communicating with each other through network 780.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter. In this document, the meaning of the term "computer readable media" is limited to an article of manufacture for tangibly storing computer-readable instructions.

Figure 8:
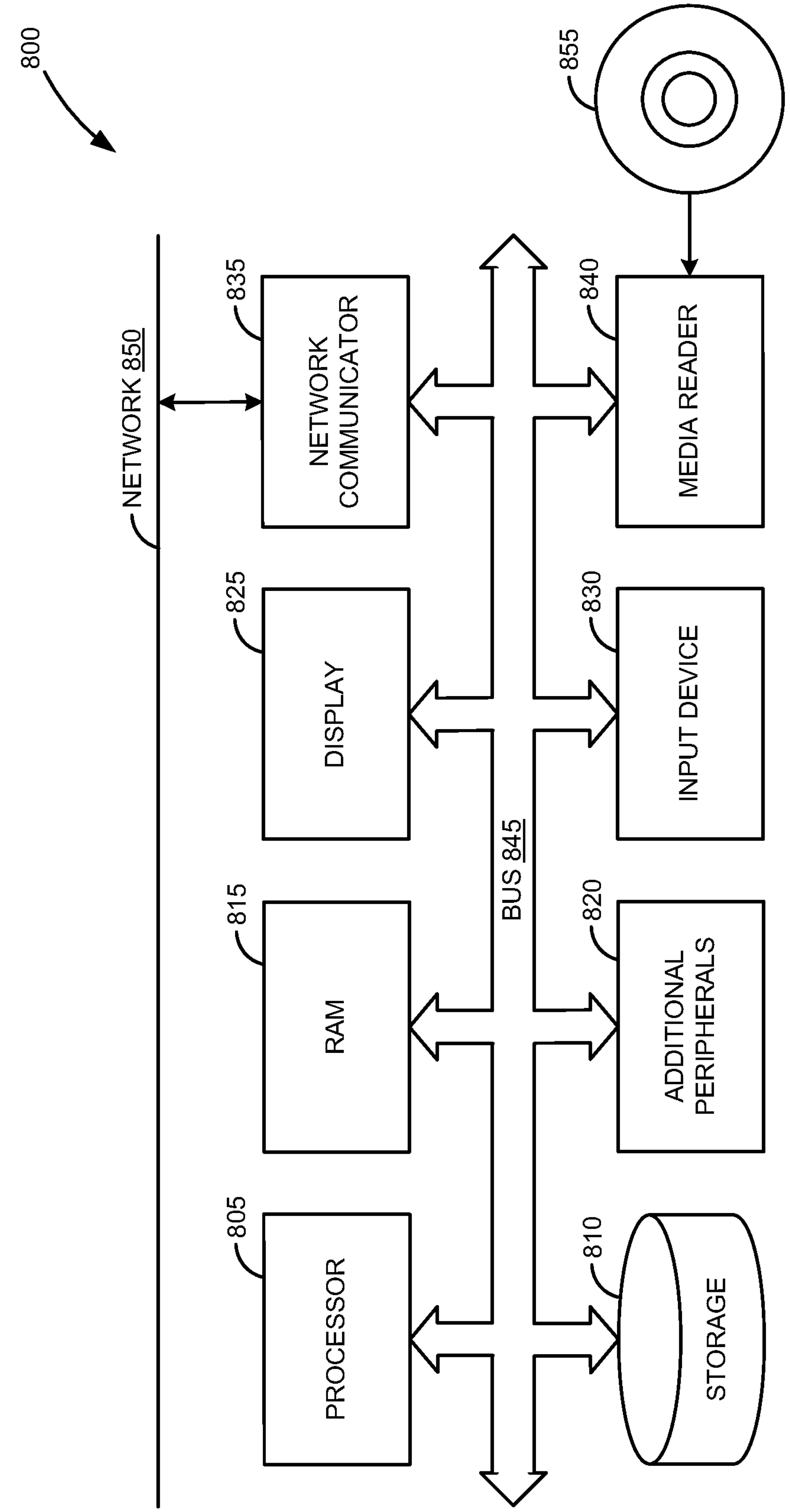
FIG. 8 is a block diagram of an exemplary computer system to execute computer readable instructions to evaluate risk of conflict between a number of fragmentary security solutions integrated in a composite security solution, according to one embodiment of the invention.

FIG. 8 is a block diagram of an exemplary computer system 800. Computer system 800 includes a processor 805 that executes programming code tangibly stored on computer readable medium 855 to perform the methods of the invention. Computer system 800 includes media reader 840 to read the programming code from data disk 855 and store the code in storage 810 or in random access memory (RAM) 815. Storage 810 provides a large space for keeping static data. The programming code could be stored in storage 810 for later execution. From the programming code, a series of instructions are generated and dynamically stored in RAM 815. Processor 805 reads instructions from RAM 815 and performs actions as instructed.

According to one embodiment of the invention, computer system 800 further includes display 825 to provide visual information to users, input device 830 to provide a user with means for entering data and interfere with computer system 800, one or more additional peripherals 820 to further expand the capabilities of computer system 800, and network communicator 835 to connect computer system 800 to network 850. The modules of computer system 800 are interconnected via bus 845.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. An article of manufacture comprising non-transitory computer-readable medium having computer readable instructions stored thereon for execution by a processor to:

receive a plurality of security requirements corresponding to a computer system;

query one or more security pattern libraries for a plurality of fragmentary security solutions, wherein each fragmentary security solution of the plurality of fragmentary security solutions satisfies at least one security requirement of the plurality of security requirements corresponding to the computer system;

evaluate a risk of conflict between the plurality of fragmentary security solutions, wherein evaluating the risk of conflict includes:

creating a weighted matrix with rows and columns corresponding to the plurality of fragmentary security solutions, setting a weighted matrix element to a first value when a first fragmentary security solution corresponding to a row of the weighted matrix element and a second fragmentary security solution corresponding to a column of the weighted matrix element are independent from each other, setting the weighted matrix element to a second value when the first fragmentary security solution corresponding to the row and the second fragmentary security solution corresponding to the column share common configuration data, setting the weighted matrix element to a third value when the first fragmentary security solution corresponding to the row is a sub-solution or a super-solution of the second fragmentary security solution corresponding to the column, and rating a risk of conflict at configuration level for a pair of the plurality of fragmentary security solutions according to a value that is set for the weighted matrix element corresponding to the pair of the plurality of fragmentary security solutions; and integrate at least two fragmentary security solutions of the plurality of fragmentary security solutions to generate a composite security solution for the computer system that satisfies the plurality of security requirements, wherein the at least two fragmentary security solutions are selected based on the evaluated risk of conflict.

2. The article of manufacture of claim 1, wherein receiving the plurality of security requirements comprises:

identifying the plurality of security requirements; and determining a context of the composite security solution.

3. The article of manufacture of claim 2, wherein the context comprises:

a context object selected from a group consisting of an environment object, a configuration object, and an object to be secured.

4. The article of manufacture of claim 1, wherein querying the one or more data storage devices for the plurality of fragmentary security solutions comprises:

identifying one or more authorities for a fragmentary security solution of the plurality of fragmentary security solutions.

5. The article of manufacture of claim 1, wherein evaluating the risk of conflict for the plurality of fragmentary security solutions comprises:

creating a binary matrix with rows corresponding to a plurality of authorities controlling the plurality of fragmentary security solutions, and columns corresponding to the plurality of fragmentary security solutions;

setting a binary matrix element to a first value when an authority corresponding to a row of the binary matrix element controls a fragmentary security solution corresponding to a column of the binary matrix element;

setting the binary matrix element to a second value when the authority corresponding to the row of the binary matrix element does not control the fragmentary security solution corresponding to the column of the binary matrix element; and counting how many binary matrix elements per at least one column of the binary matrix are set to the first value.

6. The article of manufacture of claim 5, wherein creating the binary matrix comprises:

expanding the binary matrix by appending a column corresponding to an integration of a pair of the plurality of fragmentary security solutions.

7. A computer implemented method to evaluate risk of conflict for security solutions integration, the method comprising:

receiving a plurality of security requirements corresponding to a computer system;

querying one or more security pattern libraries for a plurality of fragmentary security solutions, wherein each fragmentary security solution of the plurality of fragmentary security solutions satisfies at least one security requirement of the plurality of security requirements corresponding to the computer system;

evaluating a risk of conflict between the plurality of fragmentary security solutions, wherein evaluating the risk of conflict includes:

creating a weighted matrix with rows and columns corresponding to the plurality of fragmentary security solutions;

setting a weighted matrix element to a first value when a first fragmentary security solution corresponding to a row of the weighted matrix element and a second fragmentary security solution corresponding to a column of the weighted matrix element are independent from each other, a second value when the first fragmentary security solution and the second fragmentary security solution share common configuration data, and a third value when the first fragmentary security solution is a sub-solution or a super-solution of the second fragmentary security solution; and rating a risk of conflict at configuration level for a pair of the plurality of fragmentary security solutions according to a value that is set for the weighted matrix element corresponding to the pair of the plurality of fragmentary security solutions; and integrating at least two fragmentary security solutions of the plurality of fragmentary security solutions to generate a composite security solution for the computer system that satisfies the plurality of security requirements, wherein the at least two fragmentary security solutions are selected based on the evaluated risk of conflict.

8. The method of claim 7, wherein receiving the plurality of security requirements comprises:

identifying the plurality of security requirements; and determining a context of the composite security solution.

9. The method of claim 8, wherein the context comprises:

a context object selected from a group consisting of an environment object, a configuration object, and an object to be secured.

10. The method of claim 7, wherein querying the one or more data storage devices for the plurality of fragmentary security solutions comprises:

identifying one or more authorities for a fragmentary security solution of the plurality of fragmentary security solutions.

11. The method of claim 7, wherein evaluating the risk of conflict for the plurality of fragmentary security solutions comprises:

creating a binary matrix with rows corresponding to a plurality of authorities controlling the plurality of fragmentary security solutions, and columns corresponding to the plurality of fragmentary security solutions;

setting a binary matrix element to a first value when an authority corresponding to a row of the binary matrix element controls a fragmentary security solution corresponding to a column of the binary matrix element, or to a second value when the authority is not related to the fragmentary security solution; and rating a risk of conflict at authorization level for a fragmentary security solution according to how many binary matrix elements on a corresponding column of the binary matrix are set to the first value.

12. The method of claim 11, wherein creating the binary matrix comprises:

expanding the binary matrix by adding a column corresponding to an integration of a pair of the plurality of fragmentary security solutions.

13. A computer system to evaluate risk of conflict for security solutions integration, the computer system comprising:

a memory to store program code; and a processor communicatively coupled to the memory, the processor configured to execute the program code to receive a plurality of security requirements corresponding to a computer system;

query one or more security pattern libraries for a plurality of fragmentary security solutions, wherein each fragmentary security solution of the plurality of fragmentary security solutions to satisfy at least one security requirement of the plurality of security requirements corresponding to the computer system;

evaluate a risk of conflict between the plurality of fragmentary security solutions, wherein the evaluation of the risk of conflict includes:

creating a weighted matrix with rows and columns corresponding to the plurality of fragmentary security solutions, setting a weighted matrix element to a first value when a first fragmentary security solution corresponding to a row of the weighted matrix element and a second fragmentary security solution corresponding to a column of the weighted matrix element are independent from each other, setting the weighted matrix element to a second value when the first fragmentary security solution corresponding to the row and the second fragmentary security solution corresponding to the column share common configuration data, setting the weighted matrix element to a third value when the first fragmentary security solution corresponding to the row is a sub-solution or a super-solution of the second fragmentary security solution corresponding to the column, and rating a risk of conflict at configuration level for a pair of the plurality of fragmentary security solutions according to a value that is set for the weighted matrix element corresponding to the pair of the plurality of fragmentary security solutions; and integrate at least two fragmentary security solutions of the plurality of fragmentary security solutions to generate a composite security solution for the computer system that satisfies the plurality of security requirements, wherein the at least two fragmentary security solutions are selected based on the evaluated risk of conflict.

14. The system of claim 13, wherein receiving the plurality of security requirements comprises:

identifying the plurality of security requirements; and determining a context of the composite security solution.

15. The system of claim 14, wherein the context comprises:

a context object selected from a group consisting of an environment object, a configuration object, and an object to be secured.

16. The system of claim 13, wherein querying the one or more data storage devices for the plurality of fragmentary security solutions comprises:

identifying one or more authorities for a fragmentary security solution of the plurality of fragmentary security solutions.

17. The system of claim 13, wherein evaluating the risk of conflict for the plurality of fragmentary security solutions comprises:

creating a binary matrix with rows corresponding to a plurality of authorities controlling the plurality of fragmentary security solutions, and columns corresponding to the plurality of fragmentary security solutions;

setting a binary matrix element to a first value when an authority corresponding to a row of the binary matrix element controls a fragmentary security solution corresponding to a column of the binary matrix element;

setting the binary matrix element to a second value when the authority corresponding to the row of the binary matrix element does not control the fragmentary security solution corresponding to the column of the binary matrix element; and counting how many binary matrix elements per at least one column of the binary matrix are set to the first value.

18. The system of claim 17, wherein creating the binary matrix comprises:

expanding the binary matrix by appending a column corresponding to an integration of a pair of the plurality of fragmentary security solutions.

* * * * *